(12) United States Patent
Seo

(10) Patent No.: US 10,037,215 B2
(45) Date of Patent: Jul. 31, 2018

(54) METHOD AND APPARATUS FOR INTERWORKING APPLICATION AND WEB BROWSER

(75) Inventor: Hyung-jin Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1058 days.

(21) Appl. No.: 13/414,283

(22) Filed: Mar. 7, 2012

(65) Prior Publication Data

US 2012/0233559 A1 Sep. 13, 2012

(30) Foreign Application Priority Data

Mar. 7, 2011 (KR) .................. 10-2011-0019893

(51) Int. Cl.
*G06F 3/00* (2006.01)
*G06F 9/445* (2018.01)

(52) U.S. Cl.
CPC ............................ *G06F 9/44526* (2013.01)

(58) Field of Classification Search
CPC .............. G06F 3/048; G06F 17/30876; G06F 17/30887; G06F 17/30882; H04L 61/1511; H04L 67/02; H04L 61/2503; H04M 15/705; H04M 15/72; H04M 2203/4536; H04M 2215/7009
See application file for complete search history.

(56) References Cited

U.S. PATENT DOCUMENTS

| 2006/0274086 A1* | 12/2006 | Forstall .................. G06F 9/543 345/629 |
| 2007/0078953 A1 | 4/2007 | Chal et al. |
| 2010/0023953 A1 | 1/2010 | Lee et al. |
| 2010/0058191 A1* | 3/2010 | Hawkins ........... G06F 17/30873 715/738 |
| 2010/0162274 A1 | 6/2010 | Gangadharappa et al. |
| 2013/0013750 A1* | 1/2013 | Butler et al. .................. 709/219 |

FOREIGN PATENT DOCUMENTS

| KR | 1020060074335 | 7/2006 |
| KR | 1020100011649 | 2/2010 |
| WO | WO 2009/087023 | 7/2009 |

OTHER PUBLICATIONS

Korean Office Action dated Oct. 23, 2017 issued in counterpart application No. 10-2011-0019893, 7 pages.

* cited by examiner

*Primary Examiner* — Jeffrey A Gaffin
*Assistant Examiner* — Ayesha Huertas Torres
(74) *Attorney, Agent, or Firm* — The Farrell Law Firm, P.C.

(57) ABSTRACT

A method of interworking an application and a browser in a terminal by receiving a user input through the browser, determining whether an application related to the user input is registered in an external device, determining, if the application is registered in the external device, whether the registered application is installed in the terminal, and when the registered application is installed, running the installed application.

15 Claims, 6 Drawing Sheets

METHOD AND APPARATUS FOR INTERWORKING APPLICATION AND WEB BROWSER

PRIORITY

This application claims priority to Korean Patent Application No. 10-2011-0019893, filed on Mar. 7, 2011, in the Korean Intellectual Property Office, the entire disclosure of which is incorporated herein by reference.

BACKGROUND OF THE INVENTION

1. Field of the Invention

The present invention relates generally to a method and apparatus for interworking an application and a web browser, and more particularly, to a method and apparatus for interworking an application and a web browser in which the application is operated instead of the web browser, according to a user input to the web browser.

2. Description of the Related Art

A widget, which is generally designed to perform one function, may provide a user with a desired function by adding simple code thereto. Widgets are easy to install and delete in mobile devices and may be viewed as program modules, which are easily accessible through wallpaper on screens of mobile devices.

As widget technologies become more widespread in the fields of television and mobile devices, widget modules providing data more appropriate for television and mobile devices according to a purpose of a service provider, instead of general web data, have been used more frequently.

SUMMARY OF THE INVENTION

According to an aspect of the present invention, a method of interworking an application and a web browser in a terminal is provided, the method including receiving a user input through a web browser; determining whether an application related to the user input is registered in an external device; if the related application is registered in the external device, determining whether the registered application is installed in the terminal; and running the installed application when the registered application is installed in the terminal.

The method may further include, if the related application is not registered at the external device, running the web browser according to the user input.

Receiving of the user input may further include receiving a Uniform Resource Locator (URL) through the web browser.

The method may further include extracting a proper name from the received URL; and specifying the extracted proper name as an application identifier.

The method may further include requesting that the external device provide the registered application, if the related application is not installed; downloading the requested application from the external device, and installing the downloaded application.

The method may further include, if the related application is installed, storing browsing information recorded in the web browser.

The method may further include, if the running of the application is completed, running the web browser by restoring the stored browsing information.

The method may further include, if the related application is installed, comparing a version of the application registered in the external device with a version of the installed application; if the version of the registered application does not match the version of the installed application, requesting that the external device provide the application; downloading the requested application from the external device and updating the downloaded application.

According to another aspect of the present invention, an apparatus for interworking an application and a web browser is provided, the apparatus including a web browser for receiving a user input; and a control unit for determining whether the application related to a user input through the web browser is registered in an external device, determining whether the registered application is installed in the apparatus, and running the application when the registered application is installed in the apparatus.

BRIEF DESCRIPTION OF THE DRAWINGS

The above and other functions and advantages of the present invention will become more apparent by describing in detail embodiments thereof with reference to the attached drawings in which.

DETAILED DESCRIPTION OF EMBODIMENTS OF THE PRESENT INVENTION

Figure 1:
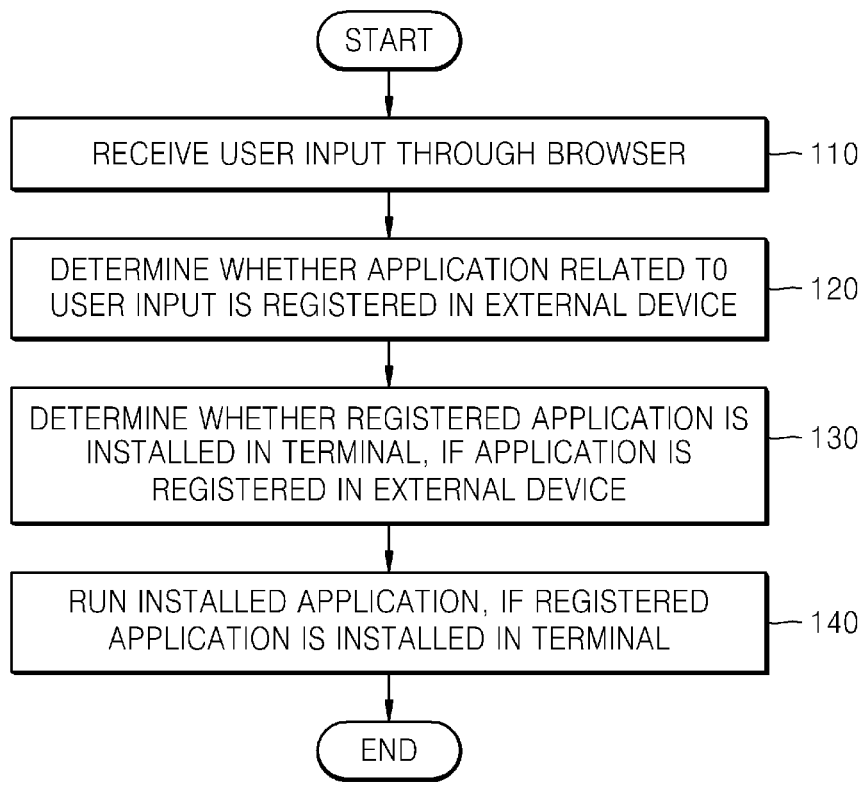
FIG. 1 is a flowchart illustrating a method of interworking an application and a web browser, according to an embodiment of the present invention.

Hereinafter, embodiments of the present invention will be described with reference to the accompanying drawings. In the following description, the same elements will be designated by the same reference numerals although they are shown in different drawings. Further, various definitions found in the following description, such as specific values of packet identifications, contents of displayed information, and the like, are provided only to help with the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention unclear.

FIG. 1 is a flowchart illustrating a method of interworking an application and a web browser, according to an embodiment of the present invention. Referring to FIG. 1, in step 110, an apparatus for interworking an application and a web browser receives a user input through a web browser. The web browser is a user interface that is used to read an on-line page created by using a mark-up language. The web browser is software which helps an internet access device of a user to access the internet, download various information, such as HyperText Markup Language (HTML), video, or music files, from a web server, interpret a layout, and display or reproduce the downloaded information. Types of information that may be provided may vary with time according to a web browser program, and types of available web browsers may vary according to a type of an internet access device, for example, a computer or an Internet TeleVision (TV). A user input refers to a command that instructs a web browser to access an address. For example, the user input may be a URL.

In step 120, the apparatus stops running the web browser and checks whether an application related to a user input (e.g., a URL input) is registered in an external device. According to an embodiment of the present invention, the application is an application for providing data more appropriate for a target, although data may also be provided via a web browser. At present, service providers provide an additional application for providing data optimized for a particular device, instead of data provided by a web browser. For example, in the case of YouTube, a YouTube service provider provides an additional application (program) according to characteristics, e.g., resolution, of an individual apparatus, such as an internet TV, an iPhone or an Android-based mobile terminal, although services may be also provided through a web browser. According to an embodiment of the present invention, an application may be a widget, which is a mini application that allows use of a predetermined function without having to use a web browser. The apparatus may extract a proper name (or a specific name) from a URL input by a user. The apparatus extracts the proper name except for general names and specifies the extracted proper name as an application identifier. For example, when a user inputs "www.YouTube.com" as a URL in a web browser, "YouTube" is specified as a main identifier of an application, without "www" or ".com". If there is any additional country top level domain, such country domain may be used as a sub-identifier, or if there is an additional service appropriate for a particular purpose, the name of the additional service may be used as a sub-identifier. The apparatus sends the specified application identifier to the external device. According to an embodiment of the present invention, the external device denotes a type of a server, which allows a user to download an application to the apparatus, and stores applications and a list of applications that may be downloaded by a user. When the external device receives an application identifier from the apparatus, the external device reviews the list of applications, based on the received application identifier. The external device then checks whether an application corresponding to the application identifier is included in the list of applications, and sends a response indicating whether the corresponding application is registered in the external device, to the apparatus.

In step 130, the apparatus receives the response from the external device, and, if the corresponding application is considered registered in the external device, searches for whether the registered application is installed in the apparatus. According to another embodiment of the present invention, even if the application is registered in the external device, when version information of the registered application is different from version information of the installed application, the apparatus may request that the external device provide the registered application, download the registered application from the external device, and install the downloaded application in the apparatus. In step 140, if the corresponding application is installed in the apparatus, the apparatus runs the installed application instead of the web browser.

Figure 2:
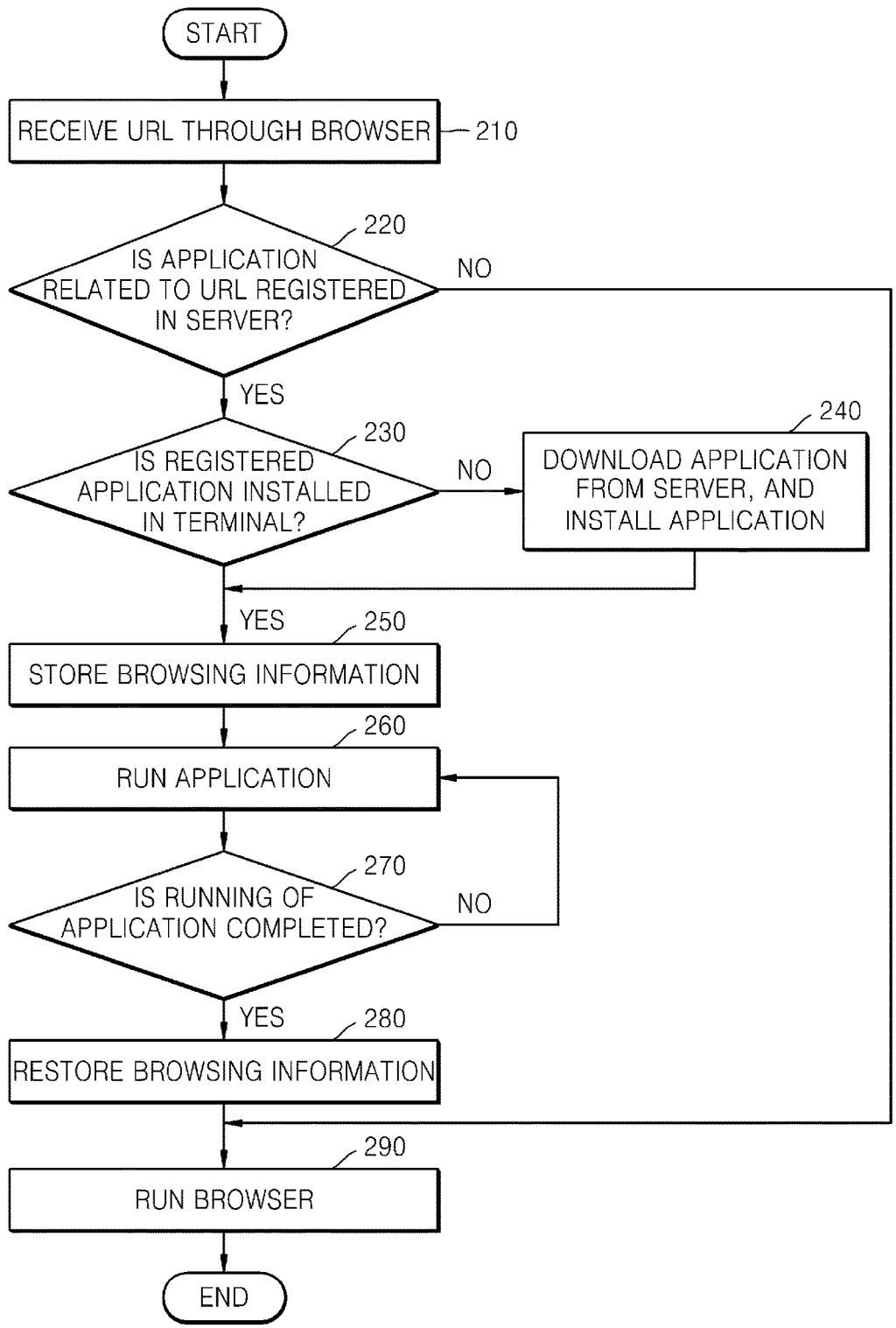
FIG. 2 is a flowchart illustrating a method of interworking an application and a web browser, according to another embodiment of the present invention.

FIG. 2 is a flowchart illustrating a method of interworking an application and a web browser, according to another embodiment of the present invention.

Referring to FIG. 2, step 210 is similar to step 110 of FIG. 2 and thus will not be described again here.

Step 220 is similar to step 120 of FIG. 1 and thus, will similarly not be described again here. If it is determined in step 220 that an application related to a URL is registered in a server, the method proceeds to step 230. If it is determined in step 220 that the application related to a URL is not registered in the server, the method proceeds to step 290. Step 230 is similar to step 130 of FIG. 1 and thus, will also not be described again here. If it is determined that the application related to a URL is installed in the apparatus, the method proceeds to step 250. If it is determined that the application related to a URL is not installed in the apparatus, the method proceeds to step 240.

In step 240, if it is determined that the application related to a URL is not installed in the apparatus, an apparatus for interworking an application and a web browser requests the application from the server, and receives and installs the requested application in the apparatus.

In step 250, the apparatus stores browsing information stored in a web browser which has stopped running so as to restore the web browser to a previous browsing state if the application does not run or running of the application is completed.

In step 260, the apparatus runs the application installed in the apparatus.

In step 270, the apparatus proceeds to step 280, if the running of the application is completed.

In step 280, the apparatus restores the stored browsing information if the running of the application is completed.

In step 290, the apparatus runs the web browser by using the restored browsing information. However, if an application related to a URL is not registered in the server, the apparatus runs the web browser according to a command corresponding to a URL input by a user. For example, it is assumed that a user inputs the URL of YouTube while the web browser displays a homepage of Google. In such a case, if a YouTube application has been run and completed, the apparatus runs the web browser to display the homepage of Google. If the YouTube application is not registered in the server, the apparatus runs the web browser to display the homepage of YouTube.

Figure 3:
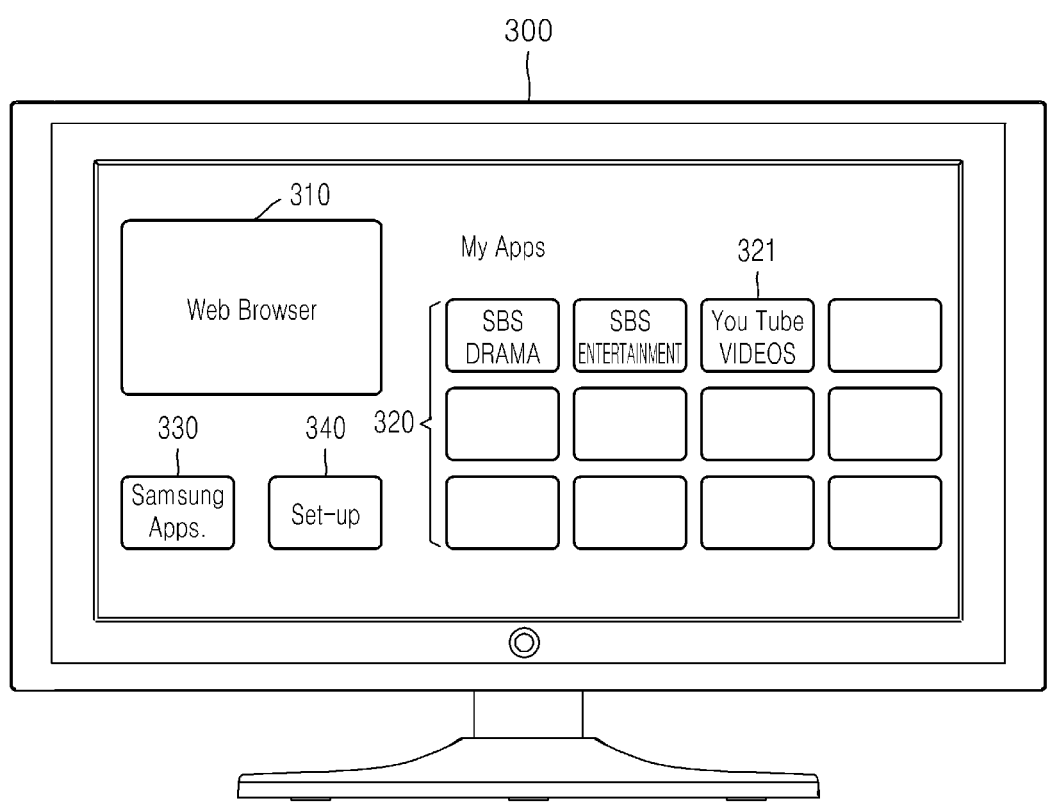
FIG. 3 illustrates a web browser and an application according to an embodiment of the present invention.

FIG. 3 illustrates a web browser and an application according to an embodiment of the present invention.

Referring to FIG. 3, a menu screen including a web browser 310, at least one application 320, and other units 330 and 340 are displayed on a TV 300 with a built-in apparatus for interworking an application and a web browser. The application 320 provides data more appropriate for the TV 300 although data may be provided via the web browser 310. The YouTube application 320 is installed in the TV 300. If a user runs the web browser 310, an image such as that illustrated in FIG. 4 is displayed on the screen of the TV 300.

Figure 4:
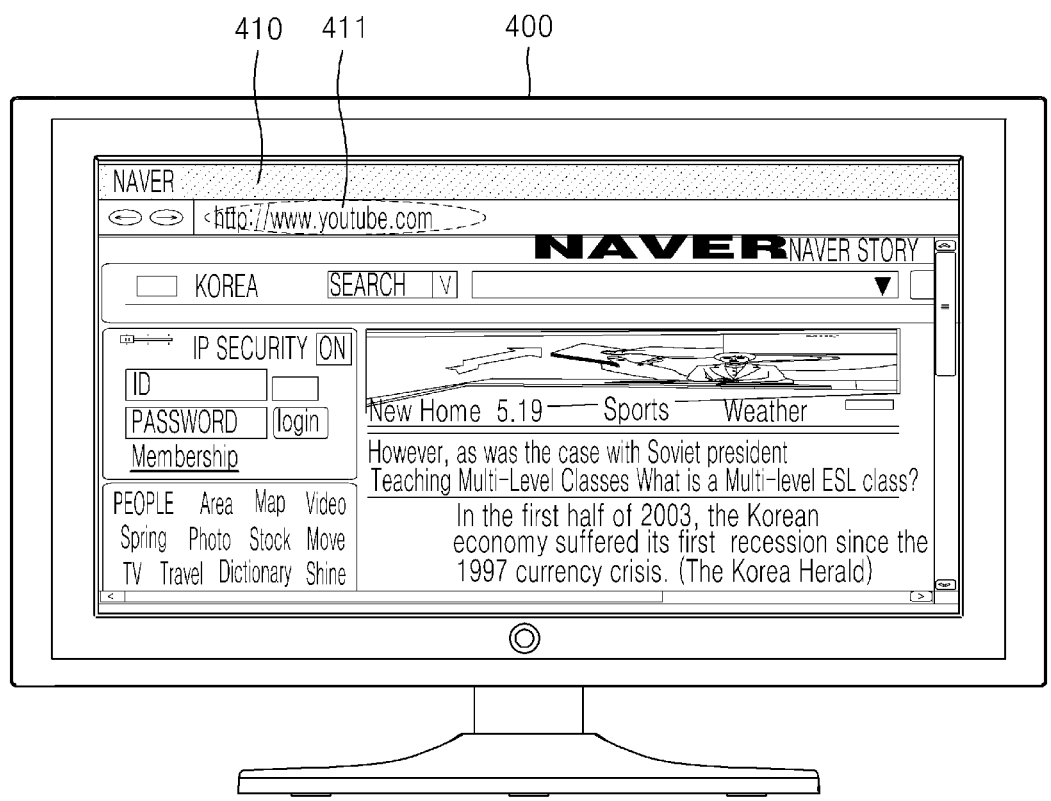
FIGS. 4 and 5 illustrate a method of interworking an application and a web browser, according to an embodiment of the present invention.
Figure 5:
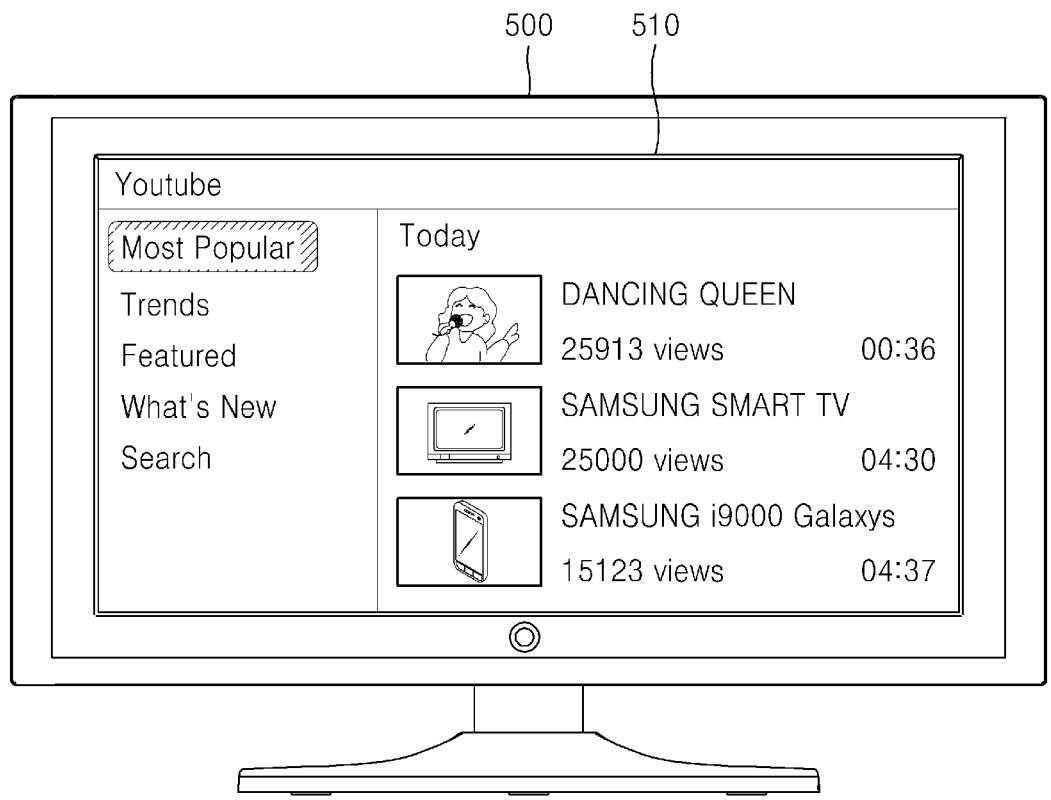

FIGS. 4 and 5 illustrate a method of interworking an application and a web browser, according to an embodiment of the present invention.

Referring to FIG. 4, a user inputs "www.youtube.com" 411 as a URL in a web browser 410 which is running on a TV 400. An apparatus for interworking an application and a web browser, which is built into the television 400, checks whether an application related to YouTube is registered in a server, and if registered, checks whether the related application is installed in the television 400. If the related application is installed in the television 400, the apparatus runs a YouTube application 510 on TV 500 as illustrated in FIG. 5.

Figure 6:
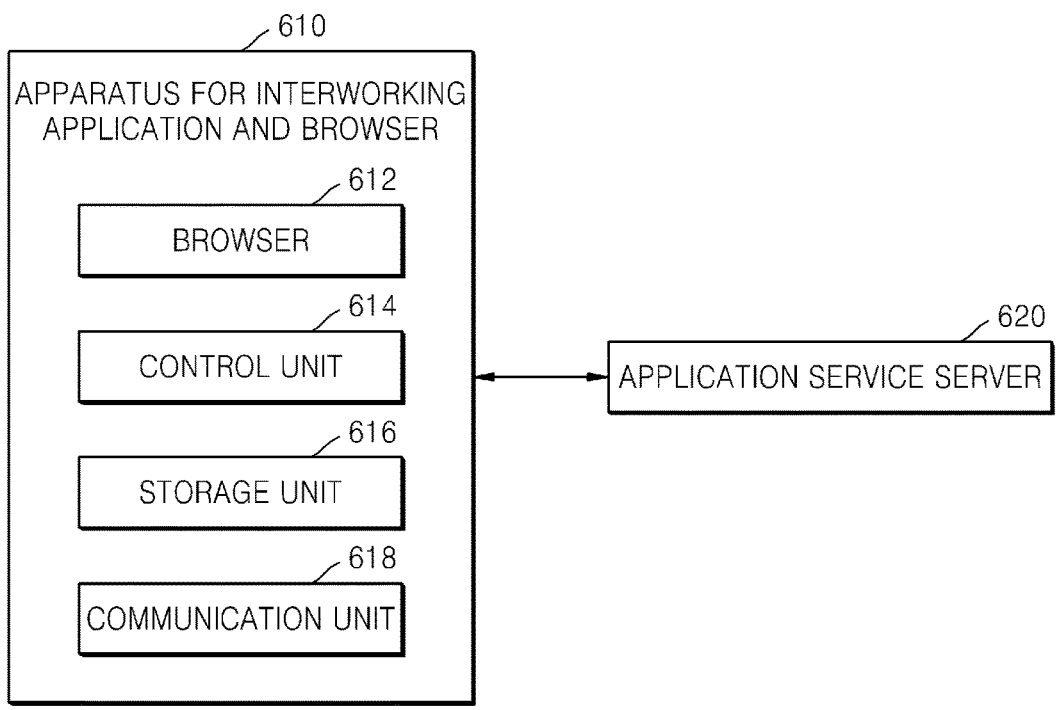
FIG. 6 is a block diagram of an apparatus for interworking an application and a web browser, according to an embodiment of the present invention.

FIG. 6 is a block diagram of an apparatus 610 for interworking an application and a web browser according to an embodiment of the present invention.

Referring to FIG. 6, the apparatus 610 includes a web browser 612, a control unit 614, a storage unit 616, and a communication unit 618, and is connected to an application service server 620 through a network (not shown).

The network may include at least one network, such as the Internet, a mobile communications network, a broadcast network, a cable television network, and a satellite network. Furthermore, the network may be referred to as a service network or an access network. The type of network is not limited, as long as the network serves as a communications protocol by which the apparatus to the application service server 620 communicate.

Unlike a web browser running in a Personal Computer (PC), the apparatus 610 serves to run an application appropriate for an individual device instead of a web browser, and may be installed in a PC, a mobile device, a television, and a set-top box.

The web browser 612 receives a user input. The web browser 612 is a user interface that is used to read an on-line page created using a mark-up language. The web browser 612 may include a user interface via which a user input is provided, and a web browser engine which receives mark-up data in a URL input when a user requests browsing and performs parsing, layout, and rendering on the mark-up data. According to an embodiment of the present invention, the web browser 612 is a web browser. Types of information that may be provided may vary with time according to a web browser program, and types of web browsers may vary according to a type of an Internet access device, for example, a computer or an Internet TV. The user input refers to a command that instructs a web browser to access another address. For example, the user input may be a URL.

The control unit 614 stops the web browser 612 running and determines whether an application related to the user input, i.e., a URL, is registered in the application service server 620. According to an embodiment of the present invention, an application is an application for providing data more appropriate for a target, although data may also be provided through the web browser 612. Currently, service providers provide an additional application for providing data optimized for a particular device, instead of data provided by the web browser 612. For example, in the case of YouTube, a YouTube service provider provides an additional application (program, "app") in accordance with characteristics such as resolution of an individual apparatus, such as an Internet TV, iPhone and an Android-based mobile terminal, although services may be provided through an Internet browser. According to an embodiment of the present invention, an application may be a widget, which is a mini application that allows use of a designated function without having to use the web browser 612. The control unit 614 may extract a proper name from a URL input by a user. Specifically, the control unit 614 extracts the proper name except for general names from the URL, and specifies the extracted proper name as an application identifier. For example, when a user inputs "www.YouTube.com" as a URL in the web browser 612, the control unit 614 specifies "YouTube" as a main identifier of an application, without the "www" or ".com". If there is any additional country top level domains, such country domain may be used as a sub-identifier, or if there is an additional service appropriate for a particular purpose, the name of the additional service may be used as the sub-identifier. The control unit 614 sends the specified application identifier to the application service server 620 through the communication unit 618. According to an embodiment of the present invention, the application service server 612 is a type of a server that allows a user to download an application to the apparatus 610, and stores applications and a list of applications that may be downloaded by a user. When the application service server 620 receives the application identifier from the apparatus 610, the application service server 620 reviews the list of applications based on the received application identifier. The application service server 620 then determines whether there is an application corresponding to the application identifier, and sends a response indicating whether the application is registered in the application service server 620, to the apparatus 610.

The communication unit 618 receives the response from the application service server 620, and then, if the application is registered in the application service server 620, searches the storage unit 616 for the application. If the application related to the URL is not registered in the application service server 620, the control unit 614 runs the web browser 612 in accordance with a command corresponding to the URL input by a user.

If the application is not installed in the storage unit 616, the control unit 614 requests that the application service server 620 provide the application through the communication unit 618, receives the requested application from the application service server 620, and installs the received application in the storage unit 616. According to another embodiment of the present invention, even if the application is registered in the application service server 620, when version information of the registered application is different from version information of the installed application, the control unit 614 may request that the application service server 620 provide the registered application, receive the requested application from the application service server 620, and install the application in the storage unit 616.

If the application is installed in the storage unit 616, the control unit 614 stores browsing information, stored in the web browser 612 which has stopped running, in the storage unit 612, so as to restore the web browser 612 to a previous browsing state if the application does not run or running of the application is completed.

The control unit 614 then runs the application, and if running of the application is completed, restores the browsing information stored in the storage unit 616 to run the web browser 612 again.

The method of interworking an apparatus and a web browser, described above, may also be embodied as computer readable code on a computer readable recording medium. The computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium may be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While this invention has been particularly shown and described with reference to embodiments thereof, it will be understood by those of ordinary skill in the art that various changes in form and details may be made therein without departing from the spirit and scope of the invention as defined by the appended claims and their equivalents.

What is claimed is:

1. A method of interworking an application and a web browser in a terminal, the method comprising:
receiving a user input comprising a uniform resource locator (URL) through the web browser;
determining an application related to the user input based on an application identifier extracted from the URL, and when the URL includes a proper name and one of a general name, a country top level domain, and an additional service, extracting the proper name from the received URL, using the extracted proper name as the application identifier, and using the one of the general name, the country top level domain, and the additional service as a sub-identifier; and
determining whether the determined application related to the user input is installed in the terminal; and
in response to receiving the user input through the web browser, if the determined application is installed in the terminal, ceasing running the web browser and running the installed application instead of the web browser,
wherein a result of running the installed application is displayed on a graphical user interface (GUI) separated from the web browser.

2. The method of claim 1, further comprising:
determining whether the related application is installed in an external device; and
running, if the related application is not registered in the external device, the browser according to the user input.

3. The method of claim 1, further comprising:
requesting, if the related application is not installed, that an external device provide the registered application; and
downloading the requested application from the external device, and installing the downloaded application.

4. The method of claim 1, further comprising, if the related application is installed, storing browsing information recorded in the browser.

5. The method of claim 4, further comprising, if running of the application is completed, running the browser by restoring the stored browsing information.

6. The method of claim 1, further comprising:
if the related application is installed, comparing a version of the application registered in an external device with a version of the installed application;
if the version of the registered application does not match the version of the installed application, requesting that the external device provide the registered application; and
downloading the requested application from the external device, and updating the installed application with the downloaded application.

7. The method of claim 1, wherein the related application is a widget.

8. An apparatus for interworking an application and a web browser, the apparatus comprising:
a controller configured to:
receive a user input comprising a uniform resource locator (URL) through the web browser;
determine an application related to the user input based on an application identifier extracted from the URL, and when the URL includes a proper name and one of a general name, a country top level domain, and an additional service, extracting the proper name from the received URL, using the extracted proper name as the application identifier, and using the one of the general name, the country top level domain, and the additional service as a sub-identifier;
determine whether the determined application which is related to the user input is installed in the apparatus; and
in response to receiving the user input through the web browser, if the determined application is installed in the apparatus, cease running the web browser and run the installed application instead of the web browser,
wherein a result of running the installed application is displayed on a graphical user interface (GUI) separated from the web browser.

9. The apparatus of claim 8, wherein the controller is further configured to determine whether the related application is installed in an external device, and run, if the related application is not registered in the external device, the browser according to the user input.

10. The apparatus of claim 8, wherein the controller is further configured to request, if the registered application is not installed in the apparatus, that an external device provide the registered application, download the requested application from the external device, and install the downloaded application in the apparatus.

11. The apparatus of claim 8, wherein the controller is further configured to store, if the registered application is installed in the apparatus, browsing information, which has been recorded in browser, in the apparatus.

12. The apparatus of claim 11, wherein the controller is further configured to run, if the running of the application is completed, the browser by restoring the browsing information stored in the apparatus.

13. The apparatus of claim 8, wherein the controller is further configured to compare, if the registered application is installed, a version of the registered application with a version of the installed application, request that an external device provide the registered application when the version of the registered application does not match the version of the installed application, download the requested application from the external device, and update the installed application with the downloaded application.

14. The apparatus of claim 8, wherein the related application is a widget.

15. A non-transitory computer readable recording medium having recorded thereon a program for implementing a method of interworking an application and a browser in a terminal, the method comprising:
receiving a user input comprising a uniform resource locator (URL) through the web browser;
determining an application related to the user input based on an application identifier extracted from the URL, and when the URL includes a proper name and one of a general name, a country top level domain, and an additional service, extracting the proper name from the received URL, using the extracted proper name as the application identifier, and using the one of the general name, the country top level domain, and the additional service as a sub-identifier;
determining whether the determined application related to the user input is installed in the terminal; and in response to receiving the user input through the web browser, if the determined application is installed in the terminal, ceasing running the web browser and running the installed application instead of the web browser, wherein a result of running the installed application is displayed on a graphical user interface (GUI) separated from the web browser.

* * * * *